(12) United States Patent
Wettlaufer

(10) Patent No.: US 9,919,247 B2
(45) Date of Patent: Mar. 20, 2018

(54) SEAMLESS FILTER BAG ASSEMBLY FOR JUICE PRESS

(71) Applicant: Eric Wettlaufer, West Falls, NY (US)

(72) Inventor: Eric Wettlaufer, West Falls, NY (US)

(*) Notice: Subject to any disclaimer, the term of this patent is extended or adjusted under 35 U.S.C. 154(b) by 482 days.

(21) Appl. No.: 14/592,564

(22) Filed: Jan. 8, 2015

(65) Prior Publication Data

US 2016/0199760 A1    Jul. 14, 2016

(51) Int. Cl.
| | |
|---|---|
| *B01D 29/35* | (2006.01) |
| *B01D 29/01* | (2006.01) |
| *B01D 39/08* | (2006.01) |
| *B01D 29/11* | (2006.01) |
| *B01D 29/27* | (2006.01) |
| *B30B 1/00* | (2006.01) |

(52) U.S. Cl.
CPC ......... *B01D 29/353* (2013.01); *B01D 29/012* (2013.01); *B01D 29/111* (2013.01); *B01D 29/27* (2013.01); *B01D 39/08* (2013.01); *B30B 1/00* (2013.01)

(58) Field of Classification Search
CPC .................................................. B01D 29/353
See application file for complete search history.

(56) References Cited

U.S. PATENT DOCUMENTS

| 220,249 A | 10/1879 | McCormick |
|---|---|---|
| 271,387 A | 1/1883 | Wilcox |
| 679,463 A | 7/1901 | Long |
| 1,410,301 A | 3/1922 | Hauf |
| 2,961,063 A | 11/1960 | Fesco |
| 4,303,011 A | 12/1981 | Reiner |
| 5,045,186 A | 9/1991 | Takashima |
| 5,267,509 A | 12/1993 | Wettlaufer |
| 2005/0051172 A1 | 3/2005 | Lee |
| 2011/0259809 A1 | 10/2011 | Quintel |

FOREIGN PATENT DOCUMENTS

JP    2013081757    5/2013

*Primary Examiner* — Peter Keyworth
(74) *Attorney, Agent, or Firm* — Woods Oviatt Gilman LLP; Katherine H. McGuire, Esq.

(57) ABSTRACT

A filter bag assembly for a juice press is assembled from a unitary sheet of fabric and at least one coupling member and/or belt. The fabric sheet is foldable along a transverse fold line and then along left and right fold lines to form a seamless bag having left and right side margins each having four sheet layers. A left coupling member may be arranged to gather at least two of the four sheet layers of the left side margin, and a right coupling member may be arranged to gather at least two of the four sheet layers of the right side margin. Each belt connects the left side margin to the right side margin. Preformed holes in the fabric sheet are positioned to allow the coupling members and belt(s) to be installed to retain the folded bag. The assembled bag is inexpensive and the fabric sheet is replaceable.

27 Claims, 7 Drawing Sheets

Fruit

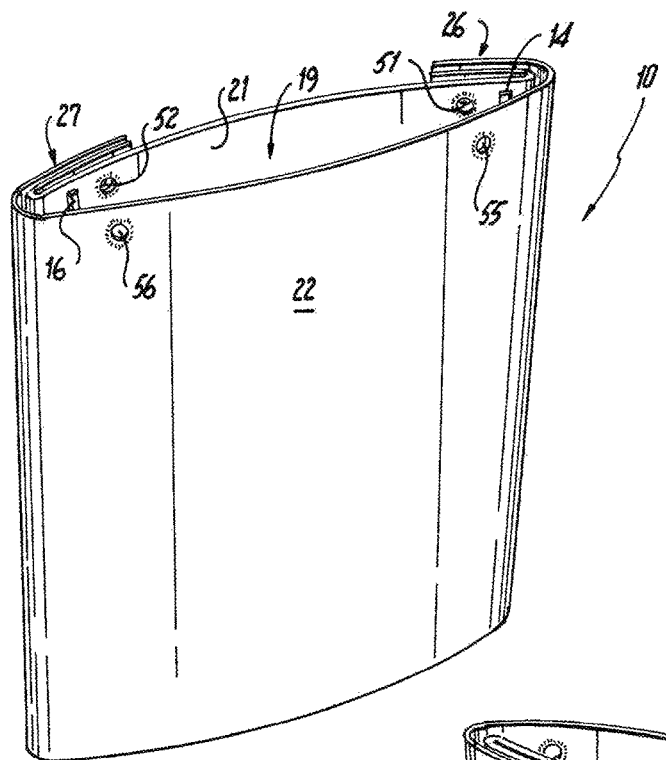
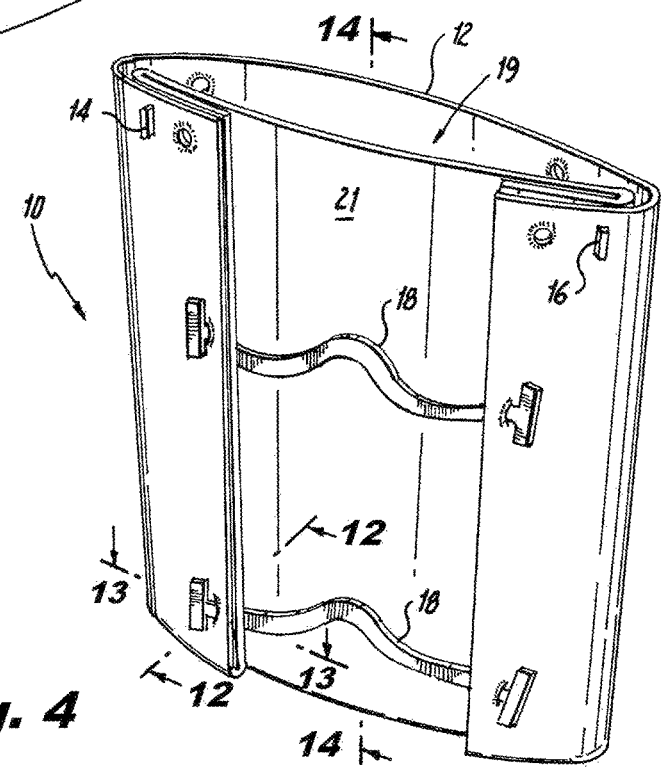

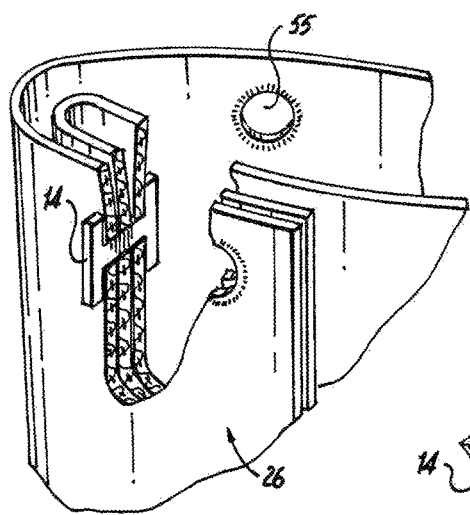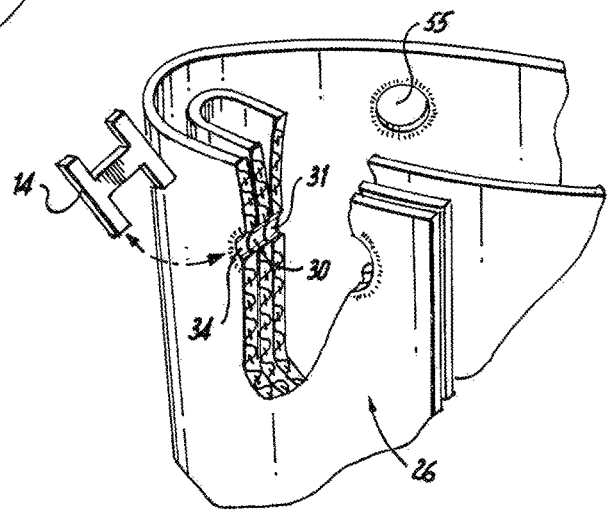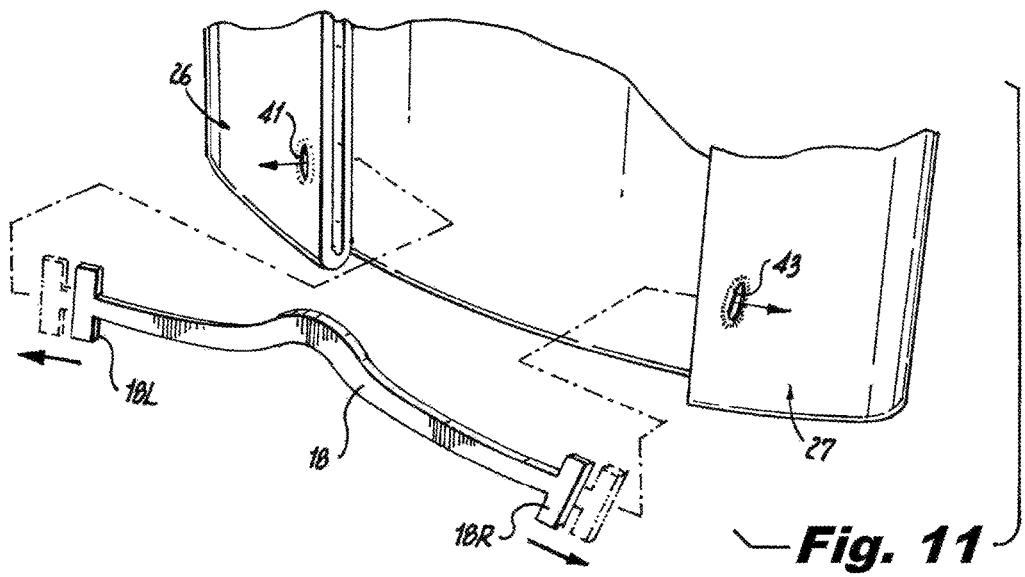

SEAMLESS FILTER BAG ASSEMBLY FOR JUICE PRESS

FIELD OF THE INVENTION

The present invention relates generally to filter bags used for filtering juice from fruits and vegetables, and more particularly to a novel filter bag assembly which may be used in a juice press machine.

The market for fresh, unprocessed fruit and vegetable juices has grown recently, driven by wider recognition of associated health benefits. Pressed juice is regarded as being of higher quality than juice produced by other methods (e.g. diffusion extraction and centrifugation) because pressing involves filtration of solids and a lower level of heat generation. Pressed juice is considered to more pleasing in taste and color than juice produced by other techniques.

In order to press juice, some type of filtration medium is required. Typically, this is a press cloth which is woven or knit and is similar to heavy cheesecloth. The most common commercial presses—vertical thin layer presses—use an open-topped bag designed for heavy duty, long-term use. The open-topped bag is filled with shredded produce, and then squeezed between two platens with forces exceeding seven tons.

As illustrated in FIGS. 1-3, these prior art filter bags have stitched seams and strapping material, and metal grommets for mounting the top border of the bag onto mounting pegs provided on the press machine. Often, two or three rows of stitching are provided around the perimeter of the bag to make the bag strong enough to resist bursting under high force. The stitching, strapping, and grommets required to make the filter bags heavy duty enough to withstand many pressings also make the bags quite hard to clean and sanitize. The stitched seams, strapping and grommets create pockets and crevices that trap organic material. Users have had to resort to soaking and tumbling the filter bags in caustic cleaning solutions to dissolve all of the trapped organic material.

The heavy duty construction of the prior art filter bags also makes the filter bags less flexible and thus more difficult to empty of organic "cake" after pressing. When a prior art bag is pressed flat in the juice press, the front and back panels of the bag are forced closer together, thereby causing sides of the bag to bow outward. When pressure is released, organic cake that is wider than the relaxed width of the bag tends to "bridge" the bag from side-to-side and become wedged in the bag. Users have had to use a tool to manually break up the cake bridge so the organic cake material will freely fall out of the bag when the bag is inverted.

Because prior art bags are difficult and time-consuming to clean, businesses that press and sell fresh juice have tended to use the same filter bag repeatedly over extended periods of time without sanitizing the bag. Using a filter bag for an entire day without proper sanitization can allow dangerous levels of pathogens to grow. An industry standard for stopping to sanitize is four hours. Indeed, local health departments are becoming more watchful of juice press sanitization issues.

In view of the drawbacks associated with current filter bags and emerging public health concerns, an improved filter bag is desired.

SUMMARY OF THE INVENTION

The present invention provides a filter bag assembly for a juice press. The assembly generally comprises a unitary sheet of fabric and at least one belt, and may further comprise a pair of coupling members. The components are assembled in a simple manner to provide a seamless filter bag that is inexpensive to make, lacks seams and corners prone to trapping organic material, and is easy to empty after use.

The unitary sheet of fabric is foldable along a transverse fold line and then along a left fold line and a right fold line to form a seamless bag that includes a left side margin and a right side margin, wherein each side margin has four sheet layers. The at least one belt connects the left side margin to the right side margin. In an embodiment described herein, two resiliently stretchable belts are provided. The coupling members include a left coupling member arranged to gather at least two of the four sheet layers of the left side margin together, and a right coupling member arranged to gather at least two of the four sheet layers of the right side margin together.

The fabric sheet may begin as a rectangular sheet having belt holes, coupling holes, and mounting holes preformed therein. Certain holes may be located to align with certain other holes when the above-mentioned folds are made such that the belt(s) and the coupling members may be received to perform their respective functions and the assembled bag may be mounted on mounting pegs of a juice press machine. After use, the fabric sheet, belt(s), and coupling members may be sanitized and reused. The fabric sheet may be discarded and replaced with a new sheet of fabric that may be assembled with the existing belt(s) and coupling members.

The invention extends to a method of assembling a filter bag for use in a juice press. The method generally comprises (A) providing a sheet of fabric having a plurality of belt holes, (B) providing at least one belt, (C) folding the sheet of fabric along a transverse fold line, (D) folding the sheet of fabric along a left fold line generally perpendicular to the transverse fold line to form a left side margin having aligned belt holes, (E) folding the sheet of fabric along a right fold line generally perpendicular to the transverse fold line to form a right side margin having aligned belt holes, (F) inserting a left end of the at least one belt into the aligned belt holes in the left side margin, and (G) inserting the right end of the at least one belt into the aligned belt holes in the right side margin. The sheet of fabric may also have a plurality of coupling holes such that the left side margin has aligned coupling holes and the right side margin has aligned coupling holes, and the method may further comprise (H) providing a left coupling member and a right coupling member, (I) inserting the left coupling member into the aligned coupling holes in the left side margin, and (J) inserting the right coupling member into the aligned coupling holes in the right side margin.

BRIEF DESCRIPTION OF THE DRAWINGS

The nature and mode of operation of the present invention will now be more fully described in the following detailed description of the invention taken with the accompanying drawing figures, in which:

FIG. 4 is a front perspective view of a filter bag assembly formed in accordance with an embodiment of the present invention;

FIG. 5 is a rear perspective view of the filter bag assembly shown in FIG. 4;

FIGS. 9 and 10 are a detailed perspective views, partially sectioned, showing installation of a coupling member through aligned coupling holes in a left side margin of the bag portion;

FIG. 11 is a detailed perspective view showing installation of opposite ends of a belt member though aligned belt holes in the left side margin and in the right side margin of the bag portion;

DETAILED DESCRIPTION OF THE INVENTION

Figure 1:
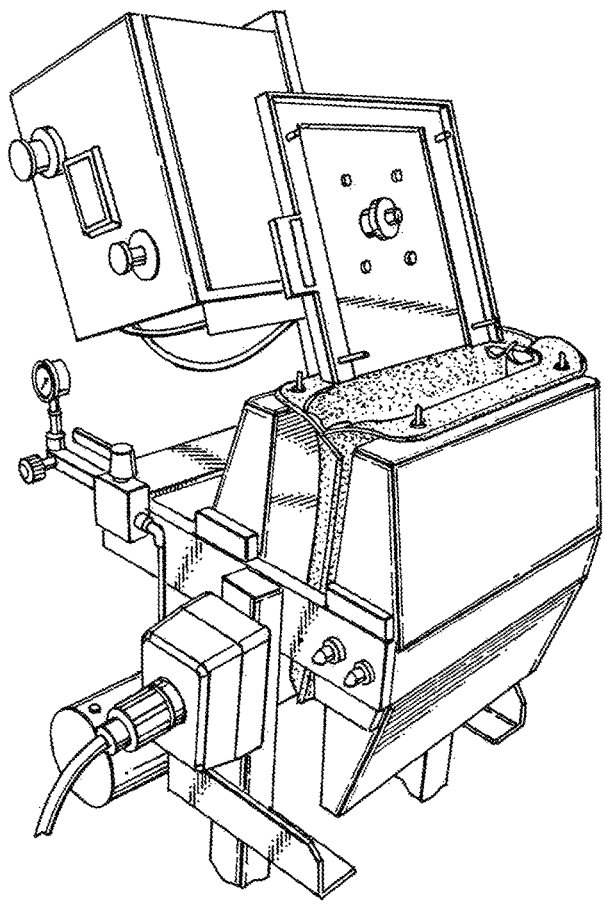
FIG. 1 is a perspective view of a prior art filter bag loaded in a juice press.
Figure 2:
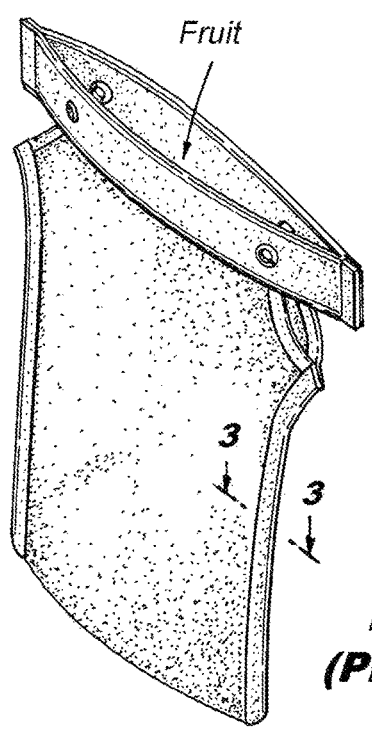
FIG. 2 is perspective view of the prior art filter bag shown in FIG. 1.
Figure 3:
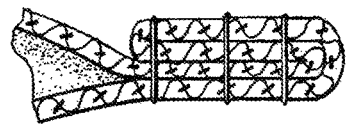
FIG. 3 is an enlarged detailed view taken generally along the line 3-3 in FIG. 2.

FIGS. 4 and 5 show a filter bag assembly 10 formed in accordance with an embodiment of the present invention. Filter bag assembly 10 has no seams, strapping or grommets, and thus it is easier to clean and sanitize than prior art filter bags. Filter bag assembly 10 is also much less expensive to manufacture than conventional filter bags, thereby making it economical to use filter bag assembly 10 for a much shorter lifespan before its fabric is discarded or recycled.

Filter bag assembly 10 generally comprises a unitary sheet of fabric 12, a left coupling member 14 and a right coupling member 16, and at least one belt 18. As will be described, filter bag assembly 10 is easily assembled by folding fabric sheet 12 along three different fold lines to form a bag, and inserting coupling members 14, 16 and opposite ends of each belt 18 into aligned holes in fabric sheet 12 to maintain the bag shape. In the depicted embodiment, exactly two belts 18 are provided, however only one belt or more than two belts may be provided. As may be seen, filter bag has an open top 19 for receiving fruit and vegetable matter.

Figure 6:
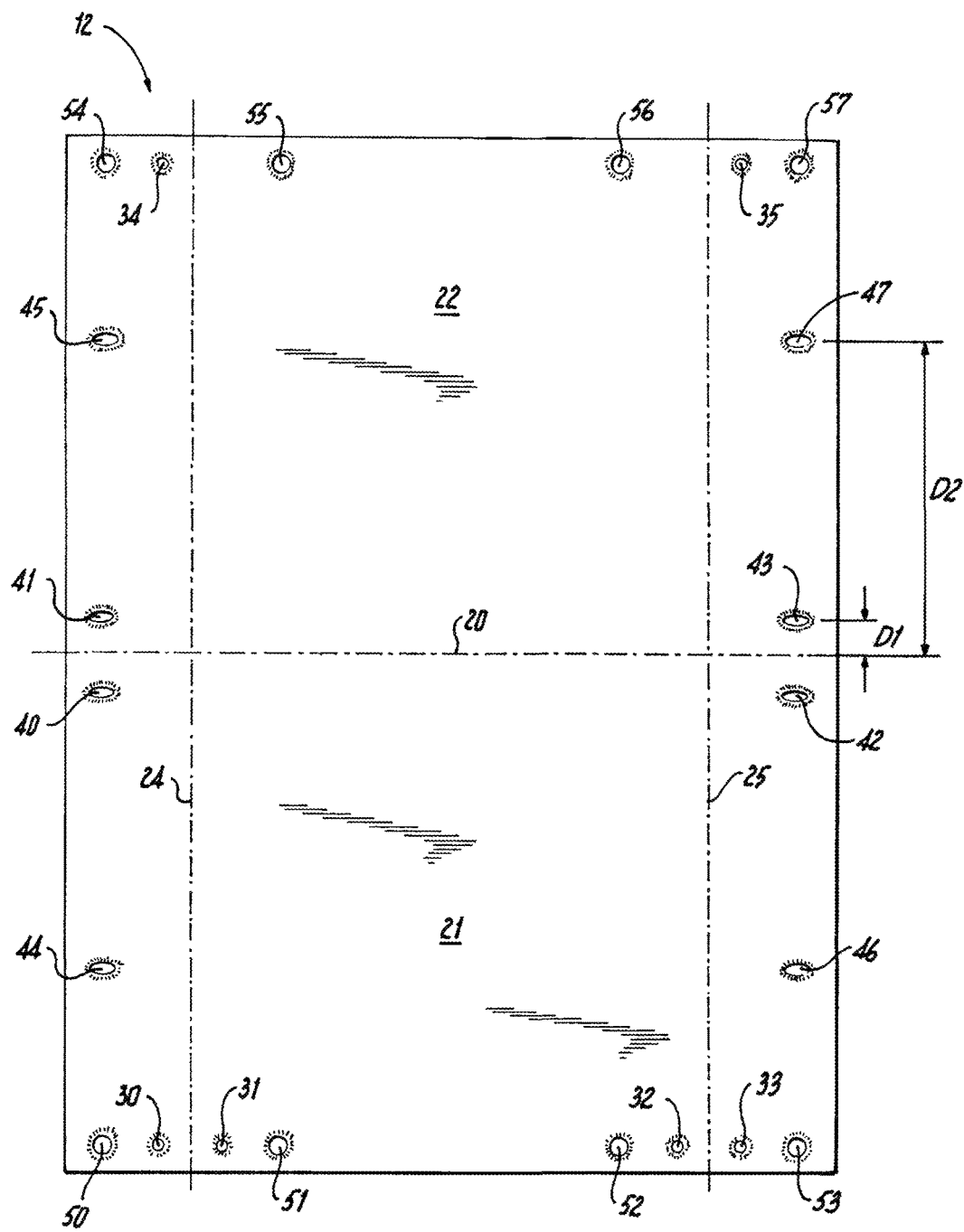
FIG. 6 is a plan view of a fabric sheet used to form the filter bag assembly shown in FIG. 4.

Fabric sheet 12 is shown in a flat plan view in FIG. 6, prior to folding. Sheet 12 may be any fabric material suitable for use as a filtration medium for pressed juice. By way of a non-limiting example, knit polypropylene may be used as the fabric material for sheet 12. Fabric sheet 12 is unitary in the sense that it is a single continuous sheet without seams. As may be seen in FIG. 6, fabric sheet 12 may be rectangular in shape. The dimensions of sheet 12 are subject to design variation, and will depend on the size of the platens of the juice press in which filter bag assembly 10 is intended to be used. Fabric sheet 12 includes a plurality of preformed holes 30-35, 40-47, and 50-57 cut from the sheet at predetermined locations. The outer peripheral edges of sheet 12, and the inner edges of the preformed holes may be hemmed by heat welding to prevent fraying and strengthen the holes without the use of stitched seams.

Figure 7:
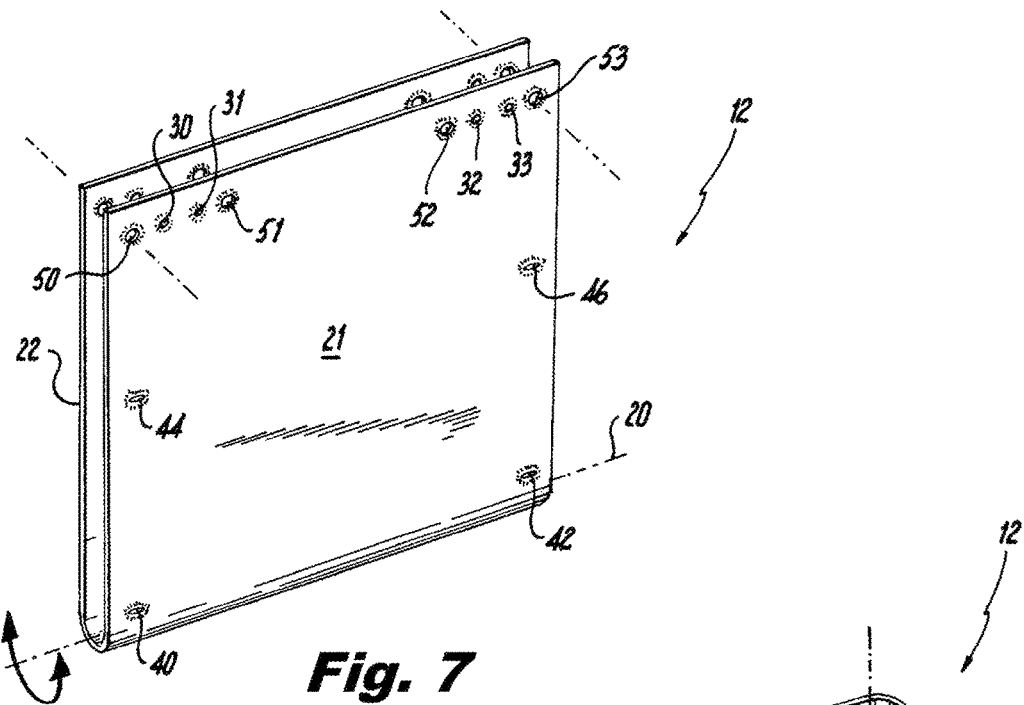
FIGS. 7 and 8 are perspective views showing how the fabric sheet of FIG. 6 is folded to form a bag portion of the filter bag assembly.
Figure 8:
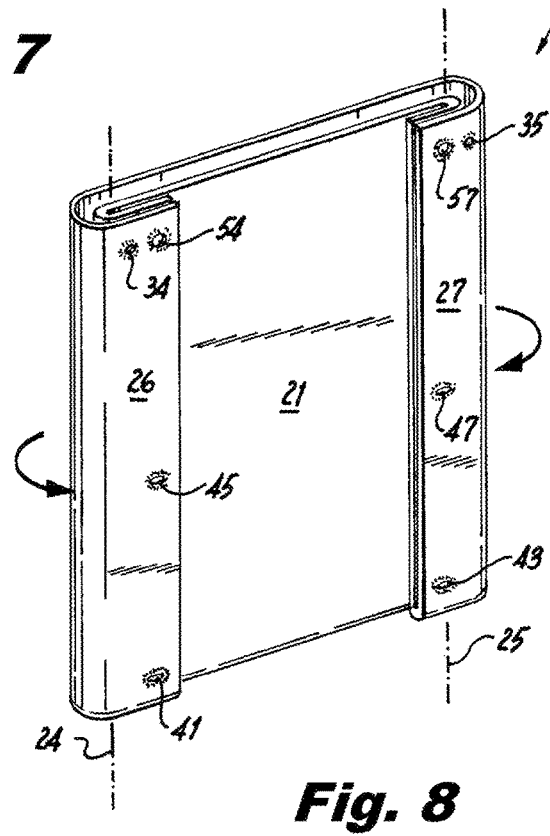

In the plan view of FIG. 6, a transverse fold line 20 divides sheet 12 into a front half 21 and a rear half 22. A left fold line 24 extends perpendicular or generally perpendicular to transverse fold line 20 near to but spaced from a left edge of sheet 12. Similarly, a right fold line 25 extends perpendicular or generally perpendicular to transverse fold line 20 near to but spaced from a right edge of sheet 12. In order to form a bag, sheet 12 is initially folded along transverse fold line 20 as shown in FIG. 7 such that the sheet will have two overlapping layers. Reference is now made to FIG. 8. After the initial fold, the two overlapping layers of sheet 12 are folded along left fold line 24 to form a left side margin 26, and along right fold line 25 to form a right side margin 27. As may be seen in FIG. 8, each side margin 26, 27 has four overlapping sheet layers.

Reference is again made to the plan view of FIG. 6 for describing the various holes 30-35, 40-47, and 50-57 provided in fabric sheet 12. In the depicted embodiment, fabric sheet 12 includes a plurality of coupling holes 30-35, a plurality of belt holes 40-47, and a plurality of mounting holes 50-57. Coupling holes 30-35 are used for receipt of coupling members 14 and 16. Belt holes 40-47 are provided to receive the opposite ends of belts 18. Mounting holes 50-57 are used for mounting the filter bag assembly onto a juice press machine.

Coupling holes 30-35 may be located relative to transverse fold line 20, left fold line 24, and right fold line 26 so that certain of the coupling holes align with one another when fabric sheet 12 is folded. In the illustrated embodiment, coupling holes 30 and 31 are arranged symmetrically to each other about left fold line 24, and coupling holes 32 and 33 are arranged symmetrically to each other about right fold line 25. Another coupling hole 34 is arranged symmetrically to coupling hole 30 about transverse fold line 20, and a further coupling hole 35 is arranged symmetrically to coupling hole 33 about transverse fold line 20. As may be understood, when sheet 12 is initially folded along transverse fold line 20 as shown in FIG. 7, coupling hole 30 aligns with coupling hole 34 and coupling hole 33 aligns with coupling hole 35. When sheet 12 is folded along left fold line 24 as shown in FIG. 8, coupling holes 30 and 34 align with coupling hole 31, wherein three of the four fabric layers of the left side margin 26 have aligned coupling holes. Likewise, when sheet 12 is folded along right fold line 25 as shown in FIG. 8, coupling holes 33 and 35 align with coupling hole 32, such that three of the four fabric layers of the right side margin 27 have aligned coupling holes.

Reference is made now to FIGS. 9 and 10. Left coupling member 14 may be inserted through aligned coupling holes 30, 34, and 31 of left side margin 26 to gather three of the four sheet layers of the left side margin together. While not shown, it is understood that right coupling member 16 may be installed in a similar manner by inserting it through aligned coupling holes 33, 35, and 32 of right side margin 27 to gather three of the four sheet layers of the right side margin together. While the illustrated embodiment shows three layers of each side margin being gathered, it is conceivable that only two layers may be gathered without straying from the invention.

Reference is again made to FIG. 6. Belt holes 40-47 may be located relative to transverse fold line 20 so that certain of the belt holes align with one another when fabric sheet 12 is folded. In the illustrated embodiment, belt holes 40 and 41 are located between left fold line 24 and the left side edge of sheet 12, and are arranged symmetrically to each other about transverse fold line 20 at a first distance D1 from the transverse fold line. On the opposite side of sheet 12, belt holes 42 and 43 are positioned between right fold line 25 and the right side edge of sheet 12, and are arranged symmetrically to each other about transverse fold line 20 at the first distance D1 from the transverse fold line. Another pair of belt holes 44 and 45 are located between left fold line 24 and the left side edge of sheet 12, and a further pair of belt holes 46 and 47 are located between right fold line 24 and the right side edge of sheet 12. Belt holes 44 and 45 are arranged symmetrically to each other about transverse fold line 20 at a second distance D2 from the transverse fold line, and belt holes 46 and 47 are arranged symmetrically to each other about transverse fold line 20 at the second distance D2 from the transverse fold line. As will be understood, when fabric sheet 12 is folded along transverse fold line 20, belt hole 40 aligns with belt hole 41, belt hole 42 aligns with belt hole 43, belt hole 44 aligns with belt hole 45, and belt hole 46 aligns with belt hole 47. When sheet 12 is folded along left fold line 24 to form left side margin 26, the left side margin will include a pair of aligned belt holes 40, 41 at distance D1 from transverse fold line 20, and another pair of aligned belt holes 44, 45 at distance D2 from transverse fold line 20. Similarly, when sheet 12 is folded along right fold line 25 to form right side margin 27, the right side margin will include a pair of aligned belt holes 42, 43 at distance D1 from transverse fold line 20, and another pair of aligned belt holes 46, 47 at distance D2 from transverse fold line 20.

Figure 12:
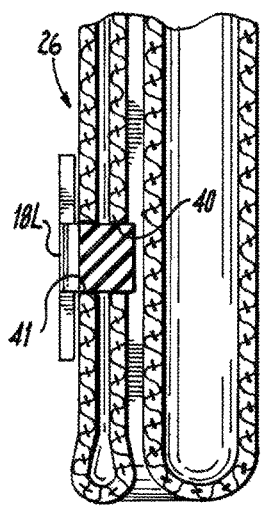
FIG. 12 is a detailed sectional view taken generally along the line 12-12 in FIG. 4.
Figure 13:
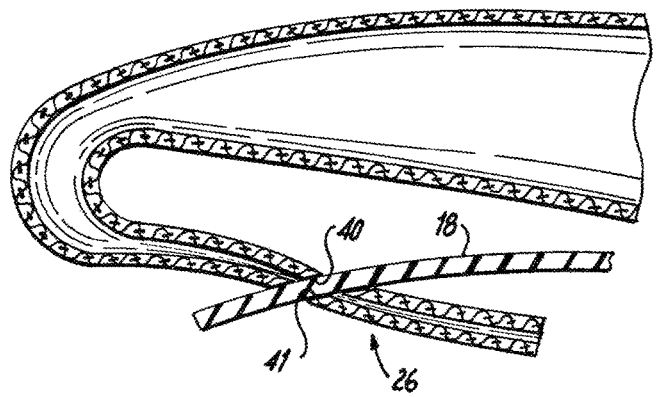
FIG. 13 is a detailed sectional view taken generally along the line 13-13 in FIG. 4.

As shown in FIGS. 11-13, a first belt 18 may be installed to connect left side margin 26 to the right side margin 27 by inserting a left end 18L of the belt into aligned belt holes 40, 41 in left side margin 26, and inserting a right end 18R of the belt into aligned belt holes 42, 43 in right side margin 27. Another belt 18 may be installed in a similar way by inserting its ends 18L, 18R into aligned belt holes 44, 45 in left side margin 26 and aligned belt holes 46, 47 in right side margin 27, respectively. Each belt 18 may be made of a resiliently stretchable material, such as synthetic rubber, and may have an undulating form (i.e. wavy or zig-zag form). Thus, filter bag assembly 10 is able to expand somewhat to avoid "bridging" of organic cake material remaining in the filter bag assembly after juice is pressed, thereby making the filter bag assembly easier to empty than filter bags of the prior art.

It is economically advantageous to make each belt 18, and coupling members 14, 16, from only one material. For example, belts 18 and coupling members 14, 16 may be cut from the same stock material, for example synthetic rubber. Belts 18 and coupling members 14, 16 may be easily removed from filter bag assembly 10, cleaned and reused with the same sheet 12 or with a new sheet 12. As will be appreciated, sheet 12 is easier to launder and sanitize than prior art bags because it is flat and has no sewn seams or pockets to trap organic material. Moreover, sheet 12 is very inexpensive to manufacture, making it far more economical to discard a used sheet 12 in favor of a new sheet, which can be assembled into a filter bag assembly 10 using existing coupling members 14, 16 and existing belt(s) 18.

Once again, attention is directed to FIG. 6. Mounting holes 50-57 may be arranged in pairs at each corner of sheet 12. In the view of FIG. 6, mounting holes 50 and 51 are symmetrically arranged about left fold line 24 near the lower left corner of sheet 12, mounting holes 52 and 53 are symmetrically arranged about right fold line 25 near the lower right corner of sheet 12, mounting holes 54 and 55 are symmetrically arranged about left fold line 24 near the upper left corner of sheet 12, and mounting holes 56 and 57 are symmetrically arranged about right fold line 25 near the upper right corner of sheet 12. Furthermore, each pair of mounting holes may be symmetrically arranged about transverse fold line 20 relative to another pair of mounting holes. In the depicted layout, mounting holes 50 and 51 are arranged symmetrically to mounting holes 54 and 55 about transverse fold line 20, and mounting holes 52 and 53 are arranged symmetrically to mounting holes 56 and 57 about transverse fold line 20. Consequently, when sheet 12 is folded along transverse fold line 20, left fold line 24, and right fold line 25 as described above, and coupling members 14 and 16 are installed, filter bag assembly 10 will have four mounting hole regions near open top 19, two on the front half 21 of assembly 10 and two on the rear half 22 of assembly 10. In front half 21, at left margin side margin 26, mounting holes 50, 51, and 54 align with one another in the sheet layers gathered by left coupling member 14. Likewise, in front half 21 at right side margin 27, mounting holes 52, 53, and 57 align with one another in the sheet layers gathered by right coupling member 16. In rear half 22, mounting hole 55 is located at left side margin 26 and mounting hole 56 is located at right side margin 27.

Figure 14:
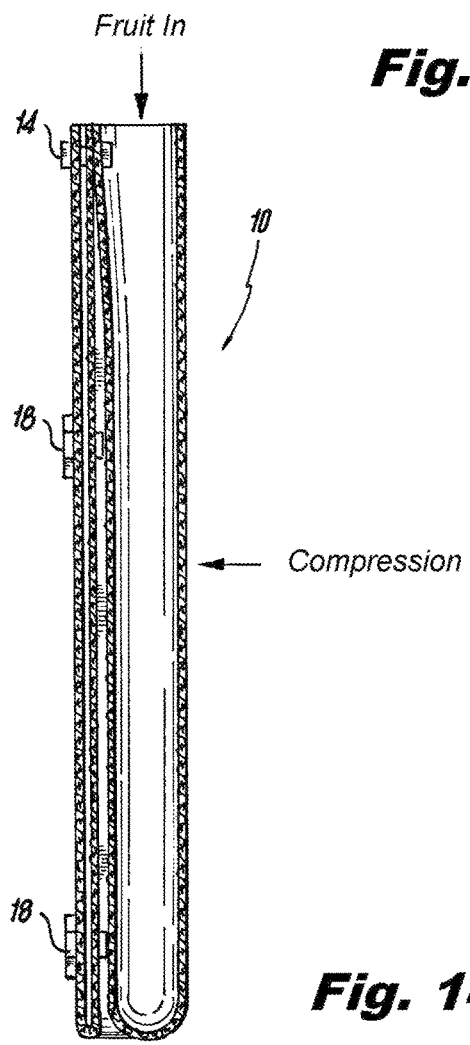
FIG. 14 is a sectional view of the filter bag assembly taken generally along the line 14-14 in FIG. 4.
Figure 15:
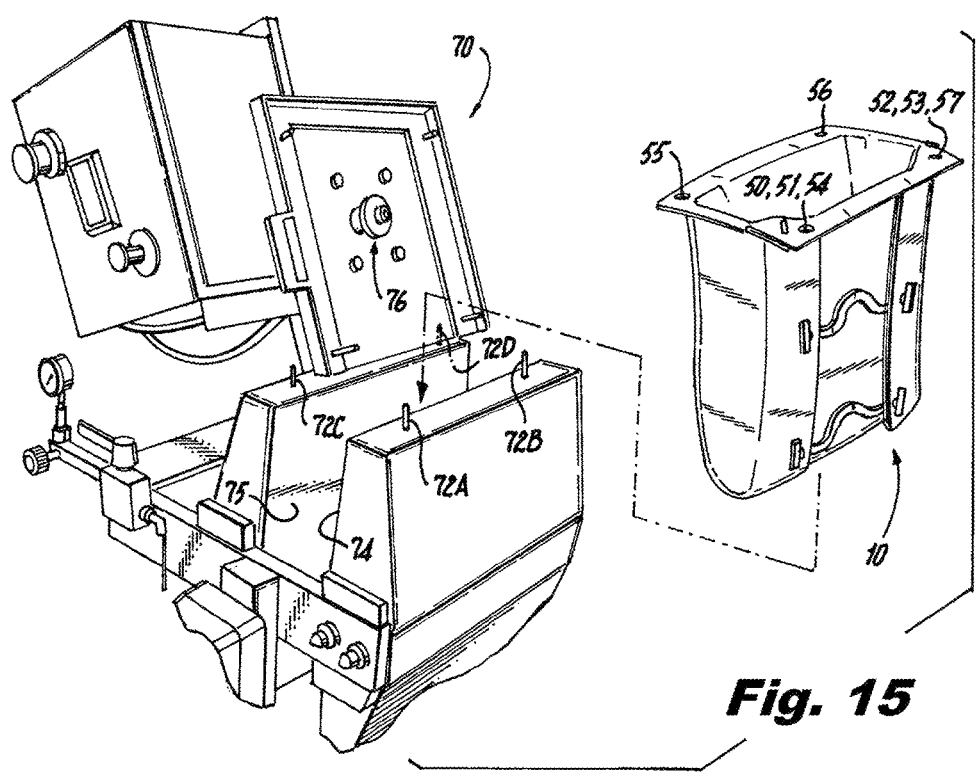
FIG. 15 is a perspective view showing how the filter bag assembly is loaded in a juice press.

Reference is now made to FIGS. 14 and 15. When assembled, filter bag assembly 10 may be mounted on a juice press machine 70 by mating the four mounting hole regions described above with respective mounting pegs 72A-72D provided at the top of opposing platens 74 and 75 of the machine. Aligned mounting holes 50, 51, and 54 are mated with mounting peg 72A, aligned mounting holes 52, 53, and 57 are mated with mounting peg 72B, mounting hole 55 is mated with mounting peg 72C, and mounting hole 56 is mated with mounting peg 72D. As may be seen, filter bag assembly 10 is positioned below a rotary shredding mechanism 76 of a juice press machine 70 with open top 19 arranged to receive fruit and/or vegetable matter as it drops from the shaving mechanism. Compression force may then be applied against the front and rear faces of filter bag assembly 10 by opposing platens 74 and 75 of juice press machine 70 to press juice, which flows through and is filtered by the fabric material of sheet 12. After pressing, filter bag assembly 10 may be lifted off of mounting pegs 72A-72D and inverted to dispense with organic cake material collected in the filter bag assembly. As mentioned above, the filter bag assembly 10 avoids bridging of the organic cake material and is therefore easier to empty than known filter bags.

Those having ordinary skill in the art will recognize that various alternatives and modifications to the embodiment described above are possible. As one example, left coupling member 14 and right coupling member 16 may be provided as component parts on platen 74 of juice press machine 70. As another example, left coupling member 14 and right coupling member 16 may be omitted altogether, such that the at least one belt 18 is the sole means for connecting at least one sheet layer of left side margin 26 to at least one sheet layer of right side margin 27. As yet another example, the dimensions of fabric sheet 12 and the placement of left and right fold lines 24 and 25 may be chosen such that left and right margins 26 and 27 overlap one another, and one or more coupling members 14, 16 may be used as a means for connecting at least one sheet layer of left side margin 26 to at least one sheet layer of right side margin 27 by gathering the layers at an overlapping location.

While the invention has been described in connection with exemplary embodiments, the detailed description is not intended to limit the scope of the invention to the particular forms set forth. The invention is intended to cover such alternatives, modifications and equivalents of the described embodiment as may be included within the spirit and scope of the invention.

What is claimed is:

1. A filter bag assembly comprising:
a unitary sheet of fabric foldable along a transverse fold line and then along a left fold line and a right fold line to form a seamless bag, wherein said seamless bag has a left side margin and a right side margin, each side margin having four sheet layers; and at least one belt connecting the left side margin to the right side margin.

2. The filter bag assembly according to claim 1, further comprising:
a left coupling member arranged to gather at least two of the four sheet layers of the left side margin together; and
a right coupling member arranged to gather at least two of the four sheet layers of the right side margin together.

3. The filter bag assembly according to claim 2, wherein the left coupling member, the right coupling member, and the at least one belt are removable from the sheet of fabric.

4. The filter bag assembly according to claim 2, wherein the sheet of fabric includes a plurality of coupling holes, the left coupling member is removably inserted through aligned coupling holes in at least two of the four sheet layers of the left side margin, and the right coupling member is removably inserted through aligned coupling holes in at least two of the four sheet layers of the right side margin.

5. The filter bag assembly according to claim 4, wherein the left coupling member is removably inserted through aligned coupling holes in exactly three of the four sheet layers of the left side margin.

6. The filter bag assembly according to claim 4, wherein the right coupling member is removably inserted through aligned coupling holes in exactly three of the four sheet layers of the right side margin.

7. The filter bag assembly according to claim 2, wherein the left coupling member and the right coupling member are identical to one another.

8. The filter bag assembly according to claim 1, wherein the at least one belt includes a plurality of belts.

9. The filter bag assembly according to claim 8, wherein the plurality of belts includes exactly two belts.

10. The filter bag assembly according to claim 1, wherein the sheet of fabric includes a plurality of belt holes, and the at least one belt includes a left end removably inserted through aligned belt holes in exactly two of the four sheet layers of the left side margin and a right end removably inserted through aligned belt holes in exactly two of the four sheet layers of the right side margin.

11. The filter bag assembly according to claim 1, wherein the at least one belt is resiliently stretchable.

12. The filter bag assembly according to claim 1, wherein the at least one belt has an undulating form.

13. The filter bag assembly according to claim 2, wherein the at least one belt, the left coupling member and the right coupling member are made from only the one material.

14. The filter bag assembly according to claim 3, wherein the plurality of coupling holes includes a first coupling hole and a second coupling hole arranged symmetrically to each other about the left fold line, a third coupling hole and a fourth coupling hole arranged symmetrically to each other about the right fold line, a fifth coupling hole arranged symmetrically to the first coupling hole about the transverse fold line, and a sixth coupling hole arranged symmetrically to the fourth coupling hole about the transverse fold line.

15. The filter bag assembly according to claim 10, wherein the plurality of belt holes includes a set of left belt holes between the left fold line and a left side edge of the sheet of fabric and a set of right belt holes between the right fold line and a right side edge of the sheet of fabric.

16. The filter bag assembly according to claim 15, wherein the set of left belt holes includes at least one pair of left belt holes arranged symmetrically to each other about the transverse fold line, and the set of right belt holes includes at least one pair of right belt holes arranged symmetrically to each other about the transverse fold line.

17. The filter bag assembly according to claim 1, wherein the sheet of fabric includes a plurality of mounting holes for mounting the filter bag assembly onto a juice press machine.

18. The filter bag assembly according to claim 17, wherein the plurality of mounting holes includes a front mounting hole in the left side margin, a rear mounting hole in the left side margin, a front mounting hole in the right side margin, and a rear mounting hole in the right side margin.

19. The filter bag assembly according to claim 1, wherein the sheet of fabric is rectangular.

20. A filter bag assembly comprising:
a unitary sheet of fabric foldable along a transverse fold line and then along a left fold line and a right fold line to form a seamless bag, wherein the said seamless bag has a left side margin and a right side margin, each side margin having four sheet layers; and
coupling means for connecting at least one sheet layer of the left side margin to at least one sheet layer of the right side margin.

21. The filter bag assembly according to claim 20, wherein the left side margin and the right side margin do not overlap one another, and the coupling means includes an elongated belt having a left end removably coupled to the at least one sheet layer of the left side margin and a right end removably coupled to the at least one sheet layer of the right side margin.

22. The filter bag assembly according to claim 21, wherein the left end of the belt is removably coupled to at least two sheet layers of the left side margin by insertion through aligned belt holes in the at least two sheet layers of the left side margin, and the right end of the belt is removably coupled to at least two sheet layers of the right side margin by insertion through aligned belt holes in the at least two sheet layers of the right side margin.

23. The filter bag assembly according to claim 20, wherein the left side margin and the right side margin overlap one another, and the coupling means includes a coupling member arranged to gather the at least one sheet layer of the left side margin and the at least one sheet layer of the right side margin together.

24. A method of assembling a filter bag for use in a juice press, the method comprising the steps of:
providing a sheet of fabric having a plurality of belt holes;
providing at least one belt;
folding the sheet of fabric along a transverse fold line;
folding the sheet of fabric along a left fold line generally perpendicular to the transverse fold line to form a left side margin having aligned belt holes;
folding the sheet of fabric along a right fold line generally perpendicular to the transverse fold line to form a right side margin having aligned belt holes;
inserting a left end of the at least one belt into the aligned belt holes in the left side margin; and
inserting the right end of the at least one belt into the aligned belt holes in the right side margin.

25. The method according to claim 24, wherein the sheet of fabric is seamless.

26. The method according to claim 24, wherein the sheet of fabric is rectangular.

27. The method according to claim 24, wherein the fabric sheet further has a plurality of coupling holes such that the left side margin has aligned coupling holes and the right side margin has aligned coupling holes, and the method further comprises the steps of:
   providing a left coupling member and a right coupling member, and inserting the left coupling member into the aligned coupling holes in the left side margin; and
   inserting the right coupling member into the aligned coupling holes in the right side margin.

* * * * *